United States Patent
Yoshiura et al.

(10) Patent No.: US 6,990,584 B1
(45) Date of Patent: Jan. 24, 2006

(54) METHOD OF AND APPARATUS FOR RESTRICTING COPY OF DIGITAL INFORMATION, AND APPARATUS FOR RECORDING DIGITAL INFORMATION

(75) Inventors: Hiroshi Yoshiura, Kawasaki (JP); Hiroyuki Kimura, Yokohama (JP); Akira Ogino, Tokyo-to (JP); Yoshiaki Moriyama, Tsurugashima (JP); Kazumi Sugaya, Tsurugashima (JP)

(73) Assignees: Pioneer Corporation, Tokyo-To (JP); Hitachi, LTD, Tokyo-To (JP); Sony Corporation, Tokyo-To (JP)

( * ) Notice: Subject to any disclaimer, the term of this patent is extended or adjusted under 35 U.S.C. 154(b) by 0 days.

(21) Appl. No.: 09/453,719

(22) Filed: Dec. 3, 1999

(30) Foreign Application Priority Data

Dec. 3, 1998 (JP) ................................ 10-344075

(51) Int. Cl.
 H04L 9/00 (2006.01)
 G06F 11/30 (2006.01)
 H04N 7/167 (2006.01)

(52) U.S. Cl. ...................... 713/176; 713/177; 713/200; 713/201; 705/51; 705/54; 705/55; 705/57; 705/59; 380/200; 380/201; 380/202; 380/203; 380/204

(58) Field of Classification Search ................ 713/200, 713/201, 177, 176; 380/200, 201, 202, 203, 380/204; 705/57, 59, 51, 55, 54; 283/13
See application file for complete search history.

(56) References Cited

U.S. PATENT DOCUMENTS

| | | | |
|---|---|---|---|
| 5,510,900 A | * | 4/1996 | Shirochi et al. ............... 386/94 |
| 5,825,892 A | | 10/1998 | Braudaway et al. .......... 380/51 |
| 5,896,454 A | * | 4/1999 | Cookson et al. ............... 360/60 |
| 5,982,977 A | * | 11/1999 | Naruse et al. ................. 386/94 |
| 6,112,008 A | | 8/2000 | Sugita et al. .................. 386/94 |
| 6,289,103 B1 | * | 9/2001 | Sako et al. .................. 380/201 |
| 6,332,194 B1 | * | 12/2001 | Bloom et al. ................ 713/176 |

FOREIGN PATENT DOCUMENTS

| | | |
|---|---|---|
| EP | 0 860 997 A2 | 8/1998 |
| EP | 0 886 274 A2 | 12/1998 |
| EP | 0 901 124 A2 | 3/1999 |
| EP | 0 903 736 A2 | 3/1999 |
| JP | 09-163341 | 6/1997 |
| JP | 10-149621 | 6/1998 |
| JP | 10-191017 | 7/1998 |
| JP | 10-285381 | 10/1998 |

OTHER PUBLICATIONS

Office Action in JP Patent Application 10-344075, dated May 20, 2005. *Abstract* machine translation.

* cited by examiner

*Primary Examiner*—Matthew Smithers
*Assistant Examiner*—Courtney D. Fields
(74) *Attorney, Agent, or Firm*—Nixon & Vanderhye, PC

(57) ABSTRACT

An apparatus for restricting a copy of digital information is provided with a detecting device for detecting a first watermark, which is buried in the digital information and comprises a first signal generated on the basis of a first rule. A burying device buries a second watermark, which comprises a second signal generated on the basis of a second rule and having a structure different from that of the first signal, into the digital information if the first watermark is detected by the detecting device. A recording apparatus is provided with: an inputting device for inputting the digital information; the above mentioned copy restricting apparatus; and a recording device for recording the digital information in which the second watermark is buried by the burying device.

31 Claims, 8 Drawing Sheets

| | a | b | c | d | e | f | g | h | i | j | k | ...... |
|---|---|---|---|---|---|---|---|---|---|---|---|---|
P1 →

FIG. 4

| | a | b | c+1 | d+1 | ... | |
|---|---|---|---|---|---|---|
P2 →

METHOD OF AND APPARATUS FOR RESTRICTING COPY OF DIGITAL INFORMATION, AND APPARATUS FOR RECORDING DIGITAL INFORMATION

BACKGROUND OF THE INVENTION

1. Field of the Invention

The present invention generally relates to a method of and an apparatus for restricting a copy or duplication of digital information such as digital video image etc., and also an apparatus for recording the digital information. More particularly, it relates to the method of and the apparatus for restricting the copy of the digital information and also the apparatus for recording the digital information, in which a copy generation of the digital information is managed by using a watermark.

2. Description of the Related Art

A digital transmission of a video image is being generalized by a realization of a digital television broadcast. A recording apparatus, which digitally records the video image onto an optical disc or magnetic tape, is also being diffused. If the video image can be digitally recorded, it is possible to copy or duplicate the video image without deterioration of the quality of the video image. Therefore, it is necessary to restrict a copy of a video image from a view point of a copy right and the like.

A watermark (i.e., an electronic watermark) technique is one of techniques for restricting the copy of the video image. The watermark technique is a technique for burying or inserting the information related to the copy restriction into the digital video image. Hereinafter, the information related to the copy restriction to be buried into the digital information is called as a "watermark". The watermark is buried in the video image so as to be hidden in the video image. Thus, even if the a watermark is buried, the quality of the video image is hardly deteriorated. Since a person, who has received the video image in which the watermark is buried, cannot recognize even an existence of the watermark in the video image, it is very difficult for him or her to remove the watermark from the video image.

When the digital video image is inputted into the recording apparatus, the recording apparatus firstly judges whether or not the watermark exists in the video image. If the watermark does not exist, the recording apparatus judges or determines that the video image is copy-allowed, and records the video image onto an optical disc for example. On the contrary, if the watermark exists, the recording apparatus judges that there is some kind of copy restriction for the video image, and does not record the video image for example. In this manner, it is possible to restrict the copy of the digital video image by the existence and absence of the watermark.

By the way, in order to solve the problem of the copy right while diffusing the digital television broadcast generally, it is necessary not only to allow or prohibit the copy of the digital video image but also to manage a generation of the copy (i.e., the number of times of the copy). For example, if it is possible to allow copying the digital information transmitted from a broadcast station just at a first generation by the recording apparatus and to prohibit copying at a second or more than second generation (i.e., to allow copying the digital information only once) for example, the receiver of the television broadcast can watch the transmitted video image by recording it without being restrained on the broadcast time, and at the same time the problem of the copy right can be solved.

In order to realize this kind of generation management of the copy of the digital video information by use of the aforementioned watermark, it is required to prepare one watermark indicating to prohibit copying and another watermark indicating to allow copying at a first generation. Further, it is required to make the recording apparatus recognize these two kinds of watermarks. Furthermore, it is required to change the watermark when recording the digital video information which is copy-allowed only at the first generation, the digital video image after recording is treated as the digital video image which is copy-prohibited or protected.

However, it is required to bury the watermark into or under the video image so that a person watching the video may not notice the existence of the watermark while restraining the deterioration of the quality of the video image. In order to satisfy these requirements, the structure of the watermark itself is limited in certain degrees. As a result, there is a problem that it is certainly difficult to prepare a plurality of kinds of watermarks and it is also difficult to change the watermark.

SUMMARY OF THE INVENTION

It is therefore an object of the present invention to provide a method of and an apparatus for restricting a copy of digital information, and an apparatus for recording the digital information, which can appropriately realize a generation management of a copy of a digital video image by using a watermark.

The above object of the present invention can be achieved by a first method of restricting a copy of digital information. The first copy restricting method is provided with: a detecting process of detecting a first watermark, which is buried in the digital information and comprises a first signal generated on the basis of a first rule; and a burying process of burying a second watermark, which comprises a second signal generated on the basis of a second rule and having a structure different from that of the first signal, into the digital information if the first watermark is detected by the detecting process.

According to the first copy restricting method of the present invention, two kinds of watermarks (i.e., the first and second watermarks) which are different in structure from each other are used. For example, by correlating these two kinds of watermarks with one watermark indicating to prohibit copying and another watermark indicating to allow copying at a first generation respectively, it is possible to realize a generation management for the copy of the digital information. Further, by burying the second watermark into the digital information in which the first watermark has been already buried, it is possible to change the information indicating the watermark. For example, by making the first watermark indicate to allow copying at the first generation and by making the second watermark indicate to prohibit copying, the copy restriction given to the digital information can be changed from the first generation copy allowance to the copy prohibition.

In one aspect of the first copy restricting method of the present invention, the burying process buries the second watermark by superimposing the second watermark onto the digital information in which the first watermark is buried.

According to this aspect, since the second watermark is superimposed onto the digital information so as to bury the second watermark, even if additional information other than the watermark is included in the digital information, it is possible to prevent the additional information from being destroyed or erased due to burying the second watermark. In this manner, it is possible to change the watermark from the first watermark (indicating to allow copying at the first generation) to the second watermark (indicating to prohibit copying) while maintaining the additional information.

In another aspect of the first copy restricting method of the present invention, the burying process has a generating process of generating the second signal by using a generation equation, which is different from that used for generating the first signal, to thereby bury the second watermark generated by the generating. process into the digital information.

According to this aspect, the second watermark constituted by the second signal, which is clearly different in structure from the first signal, can be rather easily generated just by using the generation equation different from that used for generating the first signal.

Alternatively, in another aspect of the first copy restricting method of the present invention, the burying process has a generating process of generating the second signal by using a generation equation, which is same as that used for generating the first signal, and by setting an initial value to the generation equation, which is different from that set to the generation equation for generating the first signal, to thereby bury the second watermark generated by the generating process into the digital information.

According to this aspect, the second watermark constituted by the second signal, which is clearly different in structure from the first signal, can be rather easily generated by using the generation equation same as that used for generating the first signal and just by setting the initial value (to the same generation equation) different from that set for generating the first signal.

In another aspect of the first copy restricting method of the present invention, the burying process has an intensity changing process of changing an intensity of the second watermark in accordance with a content of the digital information, to thereby bury the second watermark whose intensity is changed by the intensity changing process into the digital information.

According to this aspect, the intensity of the second watermark is changed in accordance with the content of the digital information by the intensity changing process. By this, while restraining the deterioration of the quality of the digital information due to burying the watermark, it is possible to perform a precise detection or identification of the watermark.

The above object of the present invention can be also achieved by a second method of restricting a copy of digital information. The second copy restricting method is provided with: a detecting process of detecting a first watermark, which is buried in the digital information and comprises a first signal generated on the basis of a first rule; and a rewriting process of rewriting the first watermark buried in the digital information by a second watermark, which comprises a second signal generated on the basis of a second rule and having a structure different from that of the first signal if the first watermark is detected by the detecting process.

According to the second copy restricting method of the present invention, the information indicated by the watermark is changed by rewriting the first watermark by the second watermark, which is different in structure from the first watermark. Here, "rewrite the first watermark by the second watermark" means to remove or erase the first watermark and write the second watermark for example. Therefore, by rewriting the watermark, it is possible to further reduce the degree of deterioration of the quality of the digital information due to burying the watermark. In this manner, it is possible to change the watermark from the first watermark to the second watermark while restraining the deterioration of the quality of the digital information due to burying the watermark.

In one aspect of the second copy restricting method of the present invention, the rewriting process has a generating process of generating the second signal by using a generation equation, which is different from that used for generating the first signal, to thereby rewrite the first watermark by the second watermark generated by the generating process.

According to this aspect, the second watermark, which is different in structure from the first watermark, can be rather easily generated just by using the generation equation different from that used for generating the first signal.

Alternatively, in another aspect of the second copy restricting method of the present invention, the rewriting process has a generating process of generating the second signal by using a generation equation, which is same as that used for generating the first signal, and by setting an initial value to the generation equation, which is different from that set to the generation equation for generating the first signal, to thereby rewrite the first watermark by the second watermark generated by the generating process.

According to this aspect, the second watermark, which is different in structure from the first watermark, can be rather easily generated by using the generation equation same as that used for generating the first signal and just by setting the initial value different from that set for generating the first signal.

In another aspect of the second copy restricting method of the present invention, the rewriting process has an intensity changing process of changing an intensity of the second watermark in accordance with a content of the digital information, to thereby rewrite the first watermark by the second watermark whose intensity is changed by the intensity changing process.

According to this aspect, the intensity of the second watermark is changed in accordance with the content of the digital information by the intensity changing process. By this, while restraining the deterioration of the quality of the digital information due to burying the watermark, it is possible to perform a precise detection or identification of the watermark.

In another aspect of the first or second copy restricting method of the present invention, the first watermark indicates to allow copying the digital information only at a first generation and the second watermark indicates to prohibit copying the digital information.

According to this aspect, by correlating the first watermark with one watermark indicating to allow copying at the first generation and by correlating the second watermark with another watermark indicating to prohibit copying, it is possible to realize a generation management for the copy of the digital information in a relatively simple manner.

In another aspect of the first or second copy restricting method of the present invention, the first signal comprises a first PN (Pseudorandom Noise) sequence and the second signal comprises a second PN sequence which is different from the first PN sequence.

According to this aspect, the first PN sequence may be used as the first signal while the second PN sequence, which is different in structure from the first PN sequence, may be used as the second signal. Thus, it is possible to rather easily generate the two kinds of watermarks which can be identified from each other. Further, by constituting the watermark by the PN sequence, it is possible to bury the watermark while restraining the deterioration of the quality of the digital image and keeping the audience unaware of the existence of the watermark.

In this aspect of the first or second copy restricting method of the present invention, the first PN sequence and the second PN sequence may be orthogonal to each other.

According to this aspect, it is possible to clearly identify whether the watermark buried in the digital information consists of the first PN sequence or the second PN sequence.

The above object of the present invention can be also achieved by a first apparatus for restricting a copy of digital information. The first copy restricting apparatus is provided with: a detecting device for detecting a first watermark, which is buried in the digital information and comprises a first signal generated on the basis of a first rule; and a burying device for burying a second watermark, which comprises a second signal generated on the basis of a second rule and having a structure different from that of the first signal, into the digital information if the first watermark is detected by the detecting device.

According to the first copy restricting apparatus of the present invention, in the same manner as the above described first copy restricting method of the present invention, two kinds of watermarks which are different in structure from each other are used, it is possible to realize the generation management for the copy of the digital information, and it is possible to change the information indicating the watermark.

In one aspect of the first copy restricting apparatus of the present invention, the burying device buries the second watermark by superimposing the second watermark onto the digital information in which the first watermark is buried.

According to this aspect, since the second watermark is superimposed onto the digital information so as to bury the second watermark, even if additional information other than the watermark is included in the digital information, it is possible to prevent the additional information from being destroyed or erased due to burying the second watermark.

In another aspect of the first copy restricting apparatus of the present invention, the burying device has a generating device for generating the second signal by using a generation equation, which is different from that used for generating the first signal, to thereby bury the second watermark generated by the generating device into the digital information.

According to this aspect, the second watermark constituted by the second signal, which is clearly different in structure from the first signal, can be rather easily generated just by using the generation equation different from that used for generating the first signal.

Alternatively, in another aspect of the first copy restricting apparatus of the present invention, the burying device has a generating device for generating the second signal by using a generation equation, which is same as that used for generating the first signal, and by setting an initial value to the generation equation, which is different from that set to the generation equation for generating the first signal, to thereby bury the second watermark generated by the generating device into the digital information.

According to this aspect, the second watermark constituted by the second signal, which is clearly different in structure from the first signal, can be rather easily generated by using the generation equation same as that used for generating the first signal and just by setting the initial value different from that set for generating the first signal.

In another aspect of the first copy restricting apparatus of the present invention, the burying device has an intensity changing device for changing an intensity of the second watermark in accordance with a content of the digital information, to thereby bury the second watermark whose intensity is changed by the intensity changing device into the digital information.

According to this aspect, the intensity of the second watermark is changed in accordance with the content of the digital information by the intensity changing process. By this, while restraining the deterioration of the quality of the digital information due to burying the watermark, it is possible to perform a precise detection or identification of the watermark.

The above object of the present invention can be also achieved by a second apparatus of restricting a copy of digital information. The second copy restricting apparatus is provided with: a detecting device for detecting a first watermark, which is buried in the digital information and comprises a first signal generated on the basis of a first rule; and a rewriting device for rewriting the first watermark buried in the digital information by a second watermark, which comprises a second signal generated on the basis of a second rule and having a structure different from that of the first signal if the first watermark is detected by the detecting device.

According to the second copy restricting apparatus of the present invention, in the same manner as the above described second copy restricting method of the present invention, the information indicated by the watermark is changed by rewriting the first watermark by the second watermark, and it is possible to further reduce the degree of deterioration of the quality of the digital information due to burying the watermark.

In one aspect of the second copy restricting apparatus of the present invention, the rewriting device has a generating device for generating the second signal by using a generation equation, which is different from that used for generating the first signal, to thereby rewrite the first watermark by the second watermark generated by the generating device.

According to this aspect, the second watermark constituted by the second signal, which is clearly different in structure from the first signal, can be rather easily generated just by using the generation equation different from that used for generating the first signal.

Alternatively, in another aspect of the second copy restricting apparatus of the present invention, the rewriting device has a generating device for generating the second signal by using a generation equation, which is same as that used for generating the first signal, and by setting an initial value to the generation equation, which is different from that set to the generation equation for generating the first signal, to thereby rewrite the first watermark by the second watermark generated by the generating device.

According to this aspect, the second watermark constituted by the second signal, which is clearly different in structure from the first signal, can be rather easily generated by using the generation equation same as that used for generating the first signal and just by setting the initial value different from that set for generating the first signal.

In another aspect of the second copy restricting apparatus of the present invention, the rewriting device has an intensity changing device for changing an intensity of the second watermark in accordance with a content of the digital information, to thereby rewrite the first watermark by the second watermark whose intensity is changed by the intensity changing device.

According to this aspect, the intensity of the second watermark is changed in accordance with the content of the digital information by the intensity changing process. By this, while restraining the deterioration of the quality of the digital information due to burying the watermark, it is possible to perform a precise detection or identification of the watermark.

In another aspect of the first or second copy restricting apparatus of the present invention, the first watermark indicates to allow copying the digital information only at a first generation and the second watermark indicates to prohibit copying the digital information.

According to this aspect, by correlating the first watermark with one watermark indicating to allow copying at the first generation and by correlating the second watermark with another watermark indicating to prohibit copying, it is possible to realize a generation management for the copy of the digital information in a relatively simple manner.

In another aspect of the first or second copy restricting apparatus of the present invention, the first signal comprises a first PN sequence and the second signal comprises a second PN sequence which is different from the first PN sequence.

According to this aspect, the first PN sequence may be used as the first signal while the second PN sequence, which is different in structure from the first PN sequence, may be used as the second signal.

In this aspect of the first or second copy restricting apparatus of the present invention, the first PN sequence and the second PN sequence may be orthogonal to each other.

According to this aspect, it is possible to clearly identify whether the watermark buried in the digital information consists of the first PN sequence or the second PN sequence.

The above object of the present invention can be also achieved by a first apparatus for recording digital information. The first recording apparatus is provided with: an inputting device for inputting the digital information; a detecting device for detecting a first watermark, which is buried in the digital information inputted by the inputting device and comprises a first signal generated on the basis of a first rule; a burying device for burying a second watermark, which comprises a second signal generated on the basis of a second rule and having a structure different from that of the first signal, into the digital information if the first watermark is detected by the detecting device; and a recording device for recording the digital information in which the second watermark is buried by the burying device.

According to the first recording apparatus of the present invention, when the first watermark buried in the inputted digital information is detected by the detecting device, the second watermark is buried into the digital information in which the first watermark has been already buried. Then, the recording device records the digital information, in which the second watermark is buried, onto a record medium. For example, by correlating these two kinds of watermarks with one watermark indicating to prohibit copying and another watermark indicating to allow copying at a first generation respectively, it is possible to record the inputted digital information, which is allowed to be copied at the first generation, as the digital information which is prohibited to be copied, onto the record medium. Namely, when recording the digital information, it is possible to change the copy restriction given to the digital information from the first generation copy allowance to the copy prohibition. By this, it is possible to realize a generation management for the copy of the digital information.

The above object of the present invention can be also achieved by a second apparatus for recording digital information. The second recording apparatus is provided with: an inputting device for inputting the digital information; a detecting device for detecting a first watermark, which is buried in the digital information inputted by the inputting device and comprises a first signal generated on the basis of a first rule; a rewriting device for rewriting the first watermark buried in the digital information by a second watermark, which comprises a second signal generated on the basis of a second rule and having a structure different from that of the first signal if the first watermark is detected by the detecting device; and a recording device for recording the digital information in which the first watermark is rewritten by the second watermark by the rewriting device.

According to the second recording apparatus, the information indicated by the watermark is changed by rewriting the first watermark by the second watermark, which is different in structure from the first watermark. Therefore, by rewriting the watermark, it is possible to further reduce the degree of deterioration of the quality of the digital information due to burying the watermark. In this manner, it is possible to change the watermark from the first watermark to the second watermark while restraining the deterioration of the quality of the digital information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing an example of burying a watermark into a picture constituting a digital video image in the embodiment of the present invention;

FIG. 4 is a diagram showing a condition that the watermark is buried in the picture constituting the digital video image in the embodiment of the present invention;

DETAILED DESCRIPTION OF THE PREFERRED EMBODIMENTS

Referring to the accompanying drawings, embodiments of the present invention will be now explained. In the embodiments explained below, the present invention is applied to a video recorder for recording digital video image.

I. Recording Digital Video Image and its Copy Restriction

First of all, an operation of recording a digital video image and a restriction of copying the digital video image by using a video recorder according to an embodiment of the present invention are explained with reference to FIG. 1 and FIG. 2.

Figure 1:
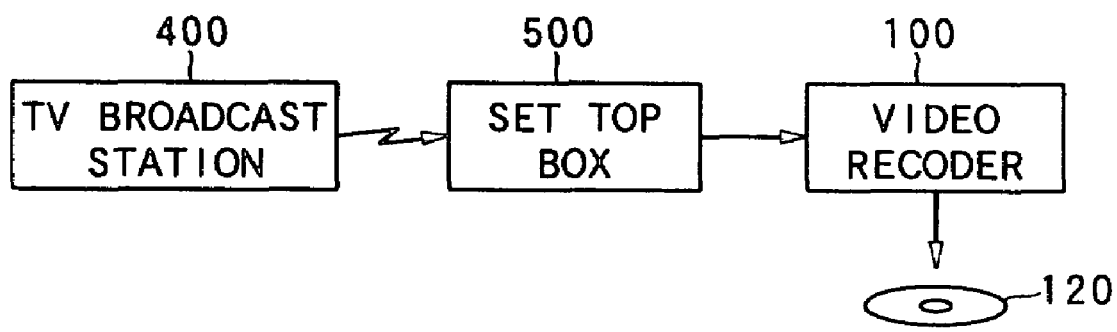
FIG. 1 is a block diagram showing a condition that digital video image transmitted from a television broadcast station is received by a video recorder etc., according to an embodiment of the present invention.

As shown in FIG. 1, a digital video image is transmitted from a television broadcast station 400. For example, with respect to the digital video image whose copy should be restricted from a view point of a copy right etc., such as a movie, a watermark (i.e., an electronic watermark) is buried or inserted into the digital video image at a stage prior to transmitting the digital video image from the television broadcast station 400.

As the watermarks in the present embodiment, there are one watermark indicating to allow copying the digital video image at a first generation and another watermark indicating to prohibit copying the digital video image. As for the digital video image in which the watermark indicating to allow copying at the first generation is buried, it is allowed to copy only at the first generation, but it is not allowed to copy at a second or more than second generation. As for the digital video image in which the watermark indicating to prohibit copying, it is not allowed to copy at all regardless of the generation. In case that the watermark is not buried in the digital video image, it is allowed to freely copy the digital video image.

Hereinbelow, the watermark indicating to allow copying the digital video image at a first generation (i.e., only once) is simply called as an "OC (One Copy) watermark", while the watermark indicating to prohibit copying the digital video image is simply called as an "NMC (No More Copy) watermark".

Normally, the OC watermark is buried in the digital video image, which is transmitted from the television broadcast station 400. By this, since it is allowed for the receiver of the digital video image to record only once the transmitted digital video image onto an optical disc 120, it is possible for the receiver to watch the transmitted video image by recording it while he or she is not restrained on the broadcast time.

The digital video image transmitted from the television station 400 is received by a set top box 500 and is sent from the set top box 500 to a video recorder 100. The video recorder 100 detects that the watermark buried in the digital video image is the OC watermark, and records the received digital video image onto the optical disc 120, for example. At this time, the video recorder 100 changes or rewrites the OC watermark to the NMC watermark. Namely, after the video recorder 100 changes the watermark buried in the digital video image from the OC watermark to the NMC watermark, the video recorder 100 records the digital video image onto the optical disc 120.

Figure 2:
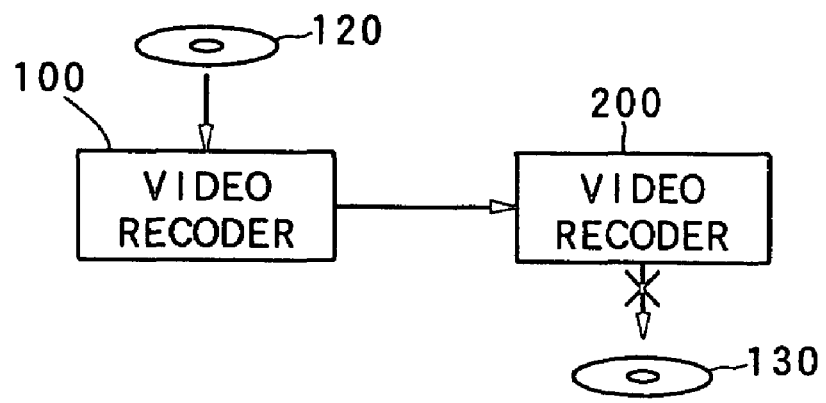
FIG. 2 is a block diagram showing a condition that two video recorders are connected to each other according to the embodiment of the present invention.

As shown in FIG. 2, the video recorder 100 is adapted to read out and reproduce the digital video image from the optical disc 120 on which the digital video image transmitted from the television broadcast station 400 is recorded, and to digitally output the digital video image toward another video recorder 200 which has a same structure as that of the video recorder 100. However, since the NMC watermark is buried in the digital video image which has been one recorded onto the optical disc 120 by the video recorder 100, the video recorder 200 cannot record the digital video image onto another optical disc 130. Namely, the video recorder 200 detects that the NMC watermark is buried in the digital video image, which indicates to prohibit copying, and does not record the digital video image onto the optical disc 130. In this manner, the copy of the digital video image is restricted, and the generation management of copying the digital video image is performed.

II. Watermark Consisting of PN Sequence

Next, a watermark buried in the digital information is explained with reference to FIG. 3 to FIG. 6.

Figures 3, 4:
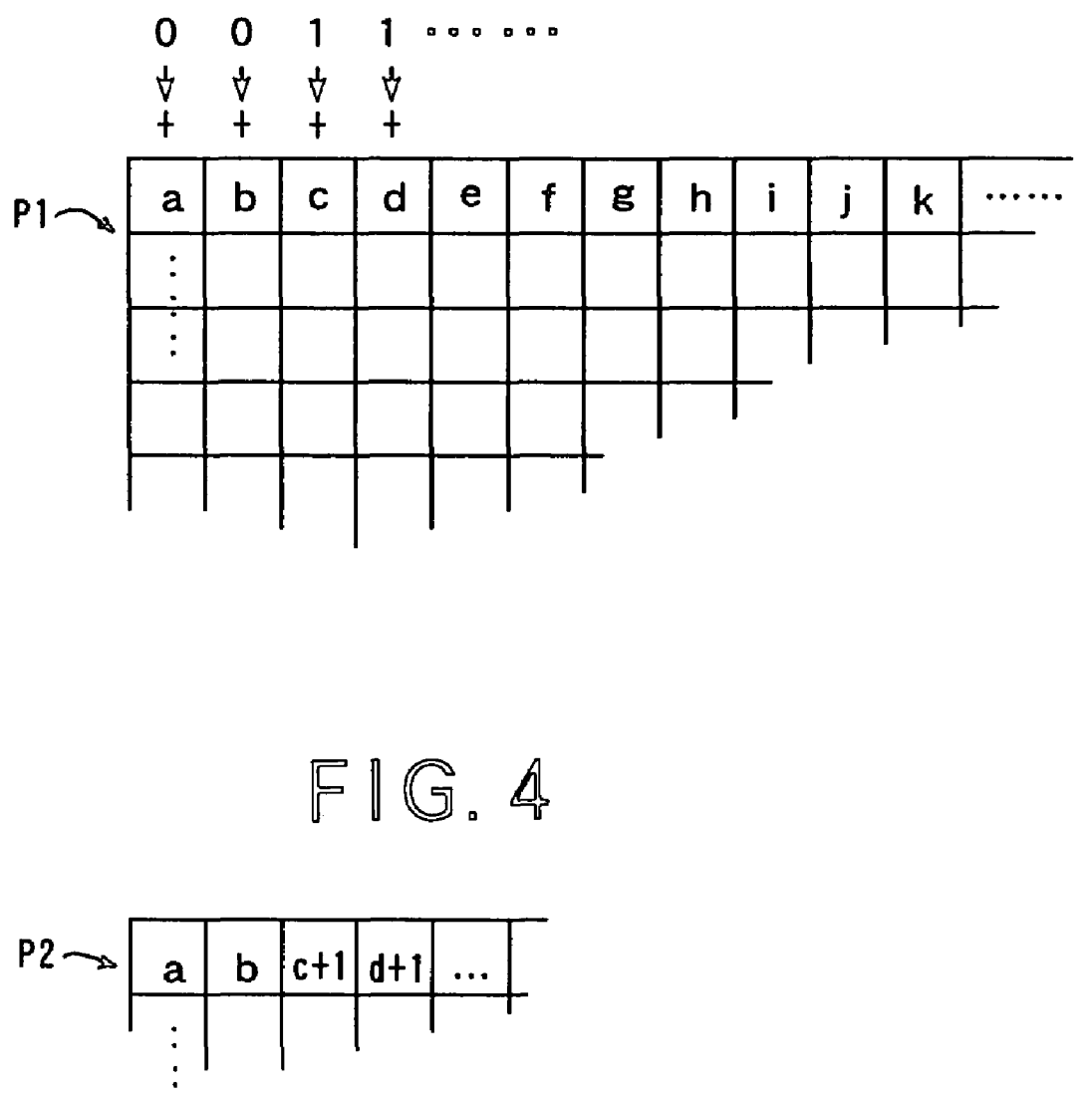

In the digital video image, information indicating the brightness or luminance of each picture constituting the pertinent digital video image is included. This information indicating the brightness has a numerical value of 4 to 8 bits for example, and corresponds to each pixel constituting the picture. Namely, the numerical value indicating the brightness for each pixel is set individually (hereinafter, this numerical value indicating the brightness of each pixel is called as a "brightness value"). This is explained concretely with reference to FIG. 3. A picture P1 in FIG. 3 is one of pictures constituting the digital video image. Each of "a", "b", "c", "d", . . . in the picture P1 indicates the brightness value set for respective one of the pixels.

The watermark is constituted by a signal or signals generated on the basis of a predetermined rule e.g., a PN (Pseudorandom Noise) sequence, for example. The PN sequence is a sequence of "1" and "0" (or "+1" and "−1"), which are generated to be pseudo-randomly arranged. An M sequence (Maximum length (shift register) sequence or Maximum Length code) is one kind of the PN sequence, which is generated by a known M sequence generator.

The watermark is buried into the picture by adding codes of the PN sequence onto the brightness values of the pixels respectively. For example, "0", "0", "1", "1", . . . in FIG. 3 is the PN sequence constituting the watermark. By adding this PN sequence onto the brightness values "a", "b", "c", "d", . . . in the picture P1, the brightness values become "a", "b", "c+1", "d+1", . . . in a picture P2 as shown in FIG. 4. In this manner, the watermark is buried into each picture constituting the digital video image.

The PN sequence constituting the watermark is a sequence of pseudorandom codes such as an M sequence, and is generated by giving an initial value to a polynomial (which is a generation equation) to generate the PN sequence. In the present embodiment, the polynomial (which is the generation equation) to generate the PN sequence is realized as a PN sequence generation circuit 1 shown in FIG. 5 for example. The PN sequence generation circuit 1 is constituted by shift registers 1A to 1D and an adder 1E.

In the present embodiment, two kinds of the PN sequences different from each other are generated, one of which is used for the OC watermark (indicating to allow copying the digital information at a first generation) and another of which is used for the NMC watermark (indicating to prohibit copying the digital information). The arrangement of random codes of the PN sequence is changed by changing one or both of the polynomial and the initial value. Therefore, by changing one or both of the polynomial and the initial value, different kinds of PN sequences can be generated.

Figure 5:
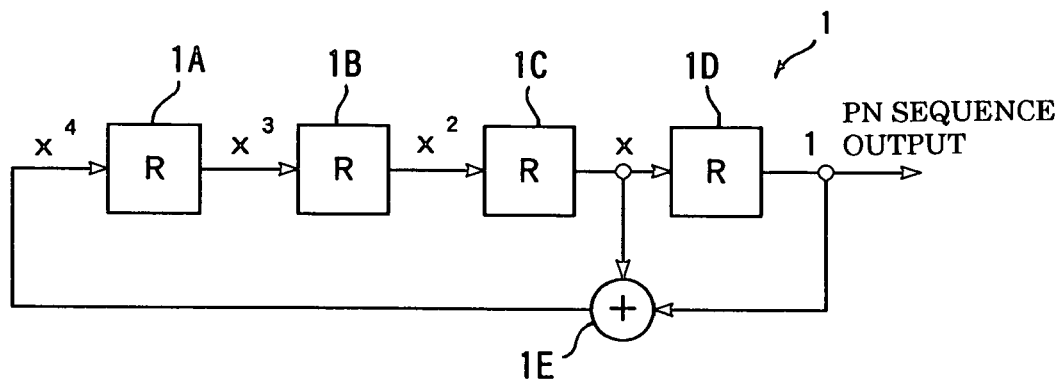
FIG. 5 is a block diagram showing a PN sequence generation circuit in the embodiment of the present invention.
Figure 6:
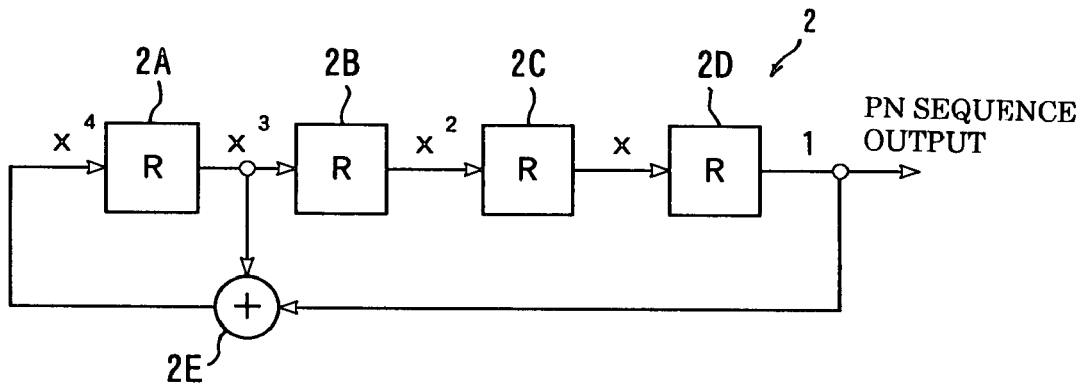
FIG. 6 is a block diagram showing another PN sequence generation circuit in the embodiment of the present invention.

For example, the PN sequence, which is used for the OC watermark, is generated by the PN sequence generation circuit 1 shown in FIG. 5. On the other hand, the PN sequence, which is used for the NMC watermark, is generated by a PN sequence generation circuit 2 shown in FIG. 6. The PN sequence generation circuit 2 shown in FIG. 6 embodies a polynomial (which is a generation equation) different from the polynomial (which is a generation equation) corresponding to the PN sequence generation circuit 1. The PN sequence generation circuit 2 is constituted by shift registers 2A to 2D and an adder 2E. The fact that the polynomial corresponding to the PN sequence generation circuit 1 and the polynomial corresponding to the PN sequence generation circuit 2 are different from each other is clear because the connection of the registers and the adder of the PN sequence generation circuit 1 and that of the PN sequence generation circuit 2 are different from each other. In this manner, by using two PN sequence generation circuits whose connections and/or structures are different from each other (i.e., two polynomials whose structure are different from each other), it is possible to generate the OC watermark and the NMC watermark.

It is also possible to generate both of the OC watermark and the NMC watermark by using only the PN sequence generation circuit 1 shown in FIG. 5. In this case, two kinds of the initial values are prepared which are to be given to the PN sequence generation circuit 1. By giving one of those two kinds of the initial values to the PN sequence generation circuit 1, the PN sequence constituting the OC watermark is generated. By giving another of those two kinds of the initial values to the PN sequence generation circuit 1, the PN sequence constituting the NMC watermark is generated. For example, in case of generating the PN sequence constituting the OC watermark, the initial value "0011" is inputted into the shift register 1A or 1D. On the other hand, in case of generating the PN sequence constituting the NMC watermark, the initial value "0101" is inputted into the shift register 1A or 1D.

III. Detection of Watermark

Next, the detection of the watermark is explained. As described above, the video recorder 100 judges whether or not the watermark is buried in the digital video image, and also judges whether the watermark indicates to allow copying at the first generation or to prohibit copying (i.e., the OC watermark or the NMC watermark), before recording the received digital video image onto the optical disc 120. The video recorder 100 performs such detection and judgment of the watermark by a following method.

At first, the PN sequence constituting the OC watermark is generated. Then, a code whose value is "1" is selected from among the codes constituting this PN sequence, and a position of this code within the PN sequence is identified. Further, the pixel corresponding to this position of the code is identified, so that the brightness value set for this pixel is read out respectively. For example, in FIG. 3, assuming that the PN sequence constituting the OC watermark is "0011 . . . ", the brightness values "c" and "d" in the picture P1 are read out respectively. By performing this kind of process for a whole picture, a sum value a 1 of all the brightness values, which have been read out in this manner, is calculated.

Next, a code whose value is "0" is selected from among the codes constituting the PN sequence constituting the OC watermark, and a position of this code within the PN sequence is identified. Further, the pixel corresponding to this position of the code is identified, so that the brightness value set for this pixel is read out respectively. For example, in FIG. 3, assuming that the PN sequence constituting the OC watermark is "0011 . . . ", the brightness values "a" and "b" in the picture P1 are read out respectively. By performing this kind of process for a whole picture, a sum value $\beta 1$ of all the brightness values, which have been read out in this manner, is calculated.

Next, a difference between the sum value $\alpha 1$ and the sum value $\beta 1$ is calculated. If the OC watermark is buried in the picture, the difference between the sum values $\alpha 1$ and $\beta 1$ becomes a relatively large value. This is because the sum value of all the brightness values in which each brightness value is increased by "1" by burying the OC watermark is the sum value $\alpha 1$, while the sum value of all the brightness values in which each brightness value is not changed at all by burying the OC watermark is the sum value $\beta 1$. On the other hand, in case that the watermark is not buried in the picture or in case that the NMC watermark is buried in the picture, the difference between the sum values $\alpha 1$ and $\beta 1$ becomes a relatively small value. Therefore, when the difference between the sum values $\alpha 1$ and $\beta 1$ is equal to or larger than a predetermined threshold value, it is possible to judge or determine that the OC watermark is buried in the picture.

Next, the PN sequence constituting the NMC watermark is generated. Then, a code whose value is "1" is selected from among the codes constituting this PN sequence, and a position of this code within the PN sequence is identified. Further, the pixel corresponding to this position of the code is identified, so that the brightness value set for this pixel is read out respectively. By performing this kind of process for a whole picture, a sum value $\alpha 2$ of all the brightness values, which have been read out in this manner, is calculated.

Next, a code whose value is "0" is selected from among the codes constituting the PN sequence constituting the NMC watermark, and a position of this code within the PN sequence is identified. Further, the pixel corresponding to this position of the code is identified, so that the brightness value set for this pixel is read out respectively. By performing this kind of process for a whole picture, a sum value $\beta 2$ of all the brightness values, which have been read out in this manner, is calculated.

Next, a difference between the sum value $\alpha 2$ and the sum value $\beta 2$ is calculated. If the NMC watermark is buried in the picture, the difference between the sum values $\alpha 2$ and $\beta 2$ becomes a relatively large value. This is because the sum value of all the brightness values in which each brightness value is increased by "1" by burying the NMC watermark is the sum value $\alpha 2$, while the sum value of all the brightness values in which each brightness value is not changed at all by burying the NMC watermark is the sum value $\beta 2$. On the other hand, in case that the watermark is not buried in the picture or in case that the OC watermark is buried in the picture, the difference between the sum values $\alpha 2$ and $\beta 2$ becomes a relatively small value. Therefore, when the difference between the sum values $\alpha 2$ and $\beta 2$ is equal to or larger than a predetermined threshold value, it is possible to judge or determine that the NMC watermark is buried in the picture.

As a result of the above detection, if the difference between the sum values $\alpha 1$ and $\beta 1$ is smaller than the predetermined threshold value and at the same time if the difference between the sum values $\alpha 2$ and $\beta 2$ is smaller than the predetermined threshold value, it is possible to judge or determine that the watermark is not buried in the picture.

Incidentally, in the above described detection method of the watermark, such a property is utilized that the total number of codes each having the value of "1" and the total number of codes each having the value of "0" are substantially equal to each other in one sequence of the PN sequence. Further, such a fact is utilized that, since the codes each having the value of "1" and the codes each having the value of "0" are uniformly dispersed in the PN sequence, if the brightness values of all the pixels constituting one picture are categorized into two groups depending upon whether each code in the PN sequence corresponds to "1" or "0", the brightness values are uniformly dispersed in each of the groups.

In the above described detection method of the watermark, in order to identify precisely the PN sequence constituting the OC watermark and the PN sequence constituting the NMC watermark, it is preferable that the PN sequence constituting the OC watermark and the PN sequence constituting the NMC watermark are orthogonal to each other.

Here, the "orthogonal" means that a cross correlation of these two PN sequences becomes substantially zero (i.e., a result of integrating a product of respective signals of these two PN sequences becomes substantially zero).

If these two PN sequences are orthogonal to each other, in case that the brightness values of all the pixels constituting the picture in which the PN sequence constituting the NMC watermark is categorized into two groups on the basis of the PN sequence constituting the OC watermark (i.e., categorized depending upon whether each code in the PN sequence constituting the OC watermark corresponds to "1" or "0"), the codes of the PN sequence constituting the NMC watermark are uniformly dispersed in each group, for example. As a result, the difference between the sum values $\alpha 1$ and $\beta 1$ becomes a relatively small value. In the same manner, in case that the brightness values of all the pixels constituting the picture in which the PN sequence constituting the OC watermark is categorized into two groups on the basis of the PN sequence constituting the NMC watermark (i.e., categorized depending upon whether each code in the PN sequence constituting the NMC watermark corresponds to "1" or "0"), the codes of the PN sequence constituting the OC watermark are uniformly dispersed in each group, for example. As a result, the difference between the sum values $\alpha 2$ and $\beta 2$ becomes a relatively small value.

IV. Structure and Operation of Video Recorder

Next a concrete structure and an operation of the video recorder 100 according to the present embodiment will be explained with reference to FIG. 7 to FIG. 11.

Figure 7:
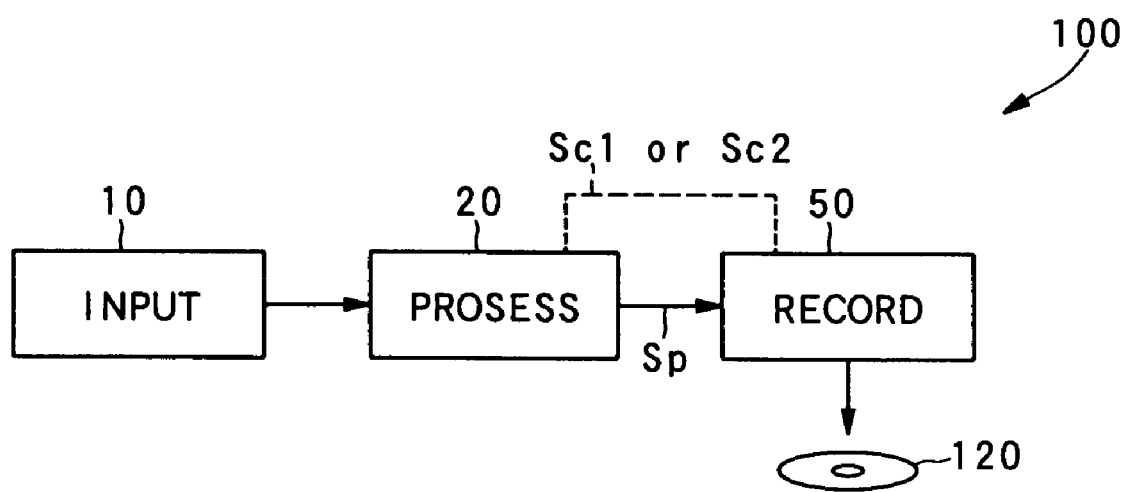
FIG. 7 is a block diagram showing a structure of a video recorder in the embodiment of the present invention.
Figure 8:
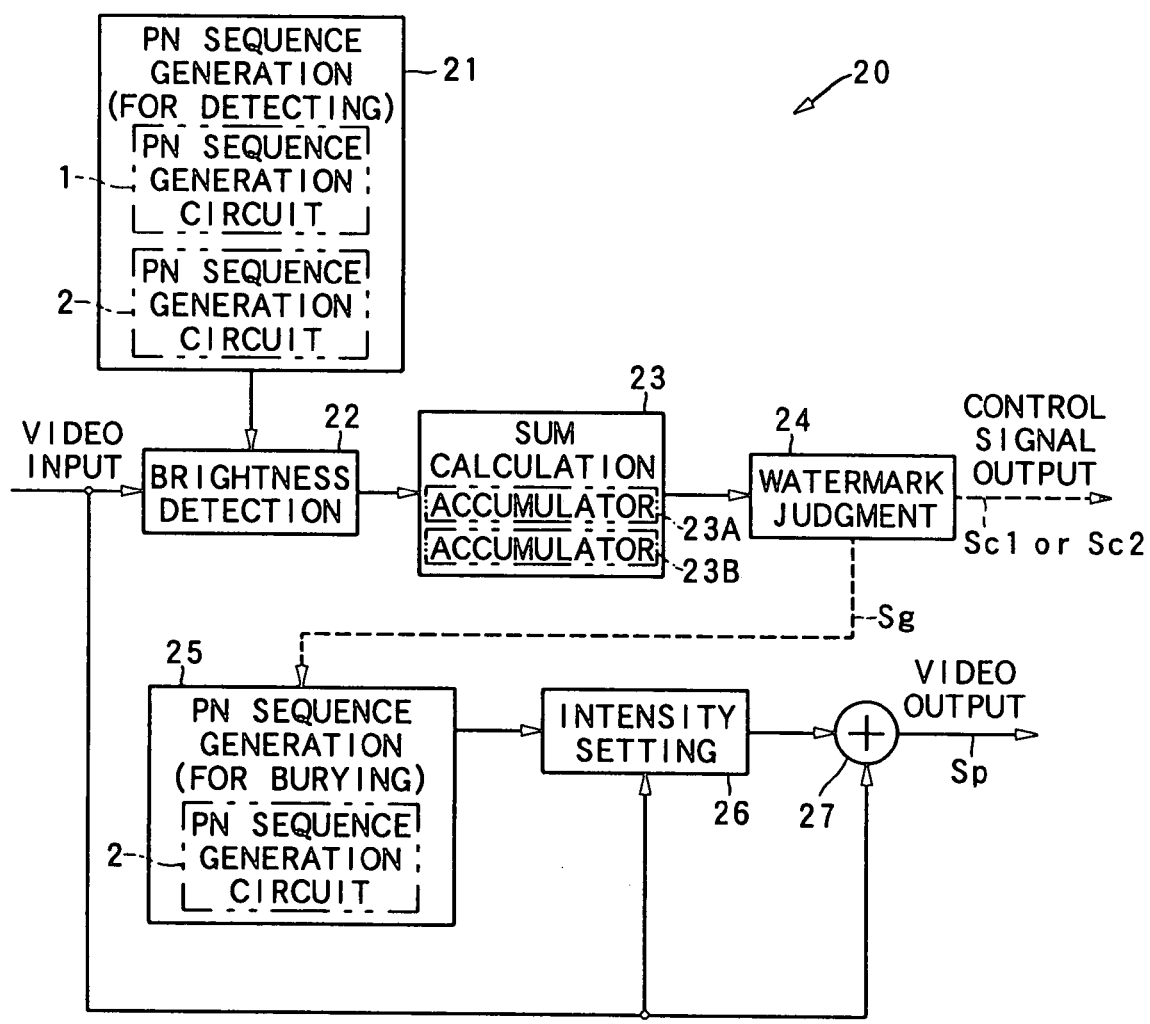
FIG. 8 is a block diagram showing a process unit of the video recorder in the embodiment of the present invention.

At first, a structure of the video recorder 100 is explained. As shown in FIG. 7, the video recorder 100 is provided with an input unit 10, a process unit 20 and a record unit 50. As shown in FIG. 8, the process unit 20 is provided with a PN sequence generation unit 21 for detecting the watermark, a brightness detection unit 22, a sum calculation unit 23, a watermark judgment unit 24, a PN sequence generation unit 25 for burying the watermark, an intensity setting unit 26 and an adder 27. Further, the PN sequence generation unit 21 is provided with the PN sequence generation circuit 1 shown in FIG. 5 and the PN sequence generation circuit 2 shown in FIG. 6. The PN sequence generation unit 25 is provided with the PN sequence generation circuit 2 shown in FIG. 6. The sum calculation unit 23 is provided with two accumulators 23A and 23B.

Next, the operation of the video recorder 100 is explained. When the digital video image is sent to the video recorder 100 from the set top box 500 (refer to FIG. 1), the input unit 10 receives the digital video image as shown in FIG. 7. Then, the input unit 10 outputs this digital video image to the process unit 20 for each picture (i.e., for each picture plane) constituting this digital video image.

When the picture is inputted to the process unit 20, the PN sequence generation unit 21, the brightness detection unit 22, the sum calculation unit 23 and the watermark judgment unit 24 shown in FIG. 8 judges whether or not the watermark is buried in the picture, and judges whether the watermark buried in the picture indicates to allow copying at the first generation or to prohibit copying (i.e., the OC watermark or the NMC watermark) by using the above described detection method of the watermark.

In more detail, at first, the sum calculation unit 23 initializes the internal values of the accumulators 23A and 23B respectively. Then, the PN sequence generation unit 21 inputs the predetermined initial value to the PN sequence generation circuit 1, so that the PN sequence generation circuit 1 generates the PN sequence constituting the OC watermark. Then, the PN sequence generation unit 21 outputs it to the brightness detection unit 22.

The brightness detection unit 22 receives the PN sequence outputted from the PN sequence generation unit 21, selects the code having the value "1" from among the codes constituting this PN sequence, and identifies the position of this code within the PN sequence. Further, the brightness detection unit 22 identifies the pixel corresponding to the position of this code, and reads out the brightness value set for this pixel. Then, the brightness detection unit 22 outputs this read out brightness value to the sum calculation unit 23. The sum calculation unit 23 accumulates the brightness values outputted from the brightness detection unit 22 to the first accumulator 23A.

The brightness detection unit 22 further selects the code having the value "0" from among the codes constituting this PN sequence outputted from the PN sequence generation unit 21, and identifies the position of this code within the PN sequence. Further, the brightness detection unit 22 identifies the pixel corresponding to the position of this code, and reads out the brightness value set for this pixel. Then, the brightness detection unit 22 outputs this read out brightness value to the sum calculation unit 23. The sum calculation unit 23 accumulates the brightness values outputted from the brightness detection unit 22 to the second accumulator 23B.

After the brightness values of all the pixels constituting one picture (i.e., one picture plane) of the digital video image are outputted from the brightness detection unit 22, the sum calculation unit 23 outputs the sum value $\alpha 1$ of the brightness values accumulated in the first accumulator 23A and the sum value $\beta 1$ of the brightness values accumulated in the second accumulator 23B, to the watermark judgment unit 24. After that, the sum calculation unit 23 initializes the accumulators 23A and 23B.

The watermark judgment unit 24 calculates the difference between the sum value $\alpha 1$ and the sum value $\beta 1$, and judges whether or not the difference is not smaller than the predetermined threshold value. If the difference is not smaller than the threshold value, the watermark judgment unit 24 outputs a control signal Sc1 to allow recording the digital video image to the record unit 50, and also outputs a control signal Sg, which indicates to generate the PN sequence constituting the NMC watermark, to the PN sequence generation unit 25.

On the other hand, if the difference between the sum value $\alpha 1$ and the sum value $\beta 1$ is smaller than the threshold value, the PN sequence generation unit 21 inputs the predetermined initial value to the PN sequence generation circuit 2, so that the PN sequence generation circuit 2 generates the PN sequence constituting the NMC watermark. Then, the PN sequence generation unit 21 outputs it to the brightness detection unit 22.

The brightness detection unit 22 receives the PN sequence outputted from the PN sequence generation unit 21, selects the code having the value "1" from among the codes constituting this PN sequence, and identifies the position of this code within the PN sequence. Further, the brightness detection unit 22 identifies the pixel corresponding to the position of this code, and reads out the brightness value set for this pixel. Then, the brightness detection unit 22 outputs this read out brightness value to the sum calculation unit 23. The sum calculation unit 23 accumulates the brightness values outputted from the brightness detection unit 22 to the first accumulator 23A.

The brightness detection unit 22 further selects the code having the value "0" from among the codes constituting this PN sequence outputted from the PN sequence generation unit 21, and identifies the position of this code within the PN sequence. Further, the brightness detection unit 22 identifies the pixel corresponding to the position of this code, and reads out the brightness value set for this pixel. Then, the brightness detection unit 22 outputs this read out brightness value to the sum calculation unit 23. The sum calculation unit 23 accumulates the brightness values outputted from the brightness detection unit 22 to the second accumulator 23B.

After the brightness values of all the pixels constituting one picture (i.e., one picture plane) of the digital video image are outputted from the brightness detection unit 22, the sum calculation unit 23 outputs the sum value $\alpha 2$ of the brightness values accumulated in the first accumulator 23A and the sum value $\beta 2$ of the brightness values accumulated in the second accumulator 23B, to the watermark judgment unit 24. After that, the sum calculation unit 23 initializes the accumulators 23A and 23B.

The watermark judgment unit 24 calculates the difference between the sum value $\alpha 2$ and the sum value $\beta 2$, and judges whether or not the difference is not smaller than the predetermined threshold value. If the difference is not smaller than the threshold value, the watermark judgment unit 24 outputs a control signal Sc2 to prohibit recording the digital video image to the record unit 50. At this time, the watermark judgment unit 24 does not output the control signal Sg to the PN sequence generation unit 25.

If the difference between the sum value $\alpha 1$ and the sum value $\beta 1$ which was previously calculated is smaller than the threshold value and at the same time if the difference between the sum value $\alpha 2$ and the sum value $\beta 2$ which is presently calculated is smaller than the threshold value, the watermark judgment unit 24 outputs the control signal Sc1 to allow recording the digital video image to the record unit 50. At this time, the watermark judgment unit 24 does not output the control signal Sg to the PN sequence generation unit 25.

Only when the control signal Sg is outputted from the watermark judgment unit 24, the PN sequence generation unit 25 generates the PN sequence constituting the NMC watermark by means of the PN sequence generation circuit 2. Then, the PN sequence generation unit 25 outputs it to the intensity setting unit 26.

The intensity setting unit 26 detects the condition of the image inputted to the process unit 20, and changes the intensity of the watermark on the basis of the detection result. More concretely, the intensity setting unit 26 detects whether the brightness values set for the respective pixels constituting one picture vary in a great degree or in a small degree. If the brightness values vary in a great degree, since the picture has a complicated pattern for example, the watermark is not conspicuous even if the watermark is buried. Therefore, when the brightness values vary in a great degree, the intensity setting unit 26 applies a process to increase the intensity of the watermark onto the PN sequence outputted from the PN sequence generation unit 25. For example, in case that the PN sequence is "0101 . . . ", this is changed to "0202 . . . " or "0303 . . . ". Then, the intensity setting unit 26 outputs the watermark (i.e., the PN sequence), whose intensity is increased, to the adder 27.

On the other hand, if the brightness values vary in a small degree, since the picture is a flat picture for example, the watermark is likely conspicuous. Therefore, when the brightness values vary in a small degree, the intensity setting unit 26 outputs the PN sequence outputted from the PN sequence generation unit 25 to the adder 27 as it is.

Figure 9:
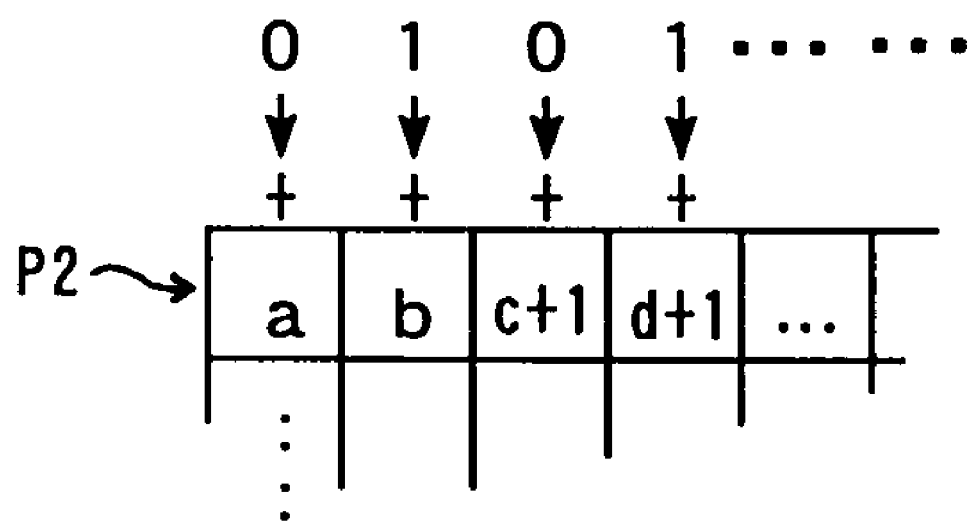
FIG. 9 is a diagram showing an example of burying a watermark by superimposing it on a picture in the embodiment of the present invention.
Figure 9:
Figure 9:
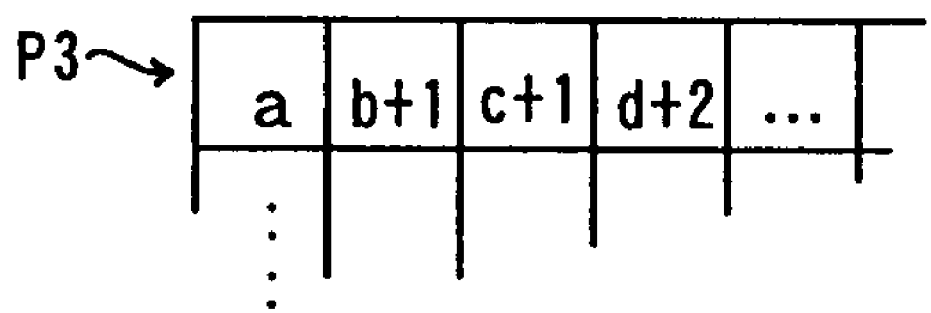

The adder 27 adds the PN sequence outputted from the intensity setting unit 26 and the picture inputted to the process unit 20 together. By this, the NMC watermark is buried and superimposed on the picture, in which the OC watermark has been already buried. For example, as shown in FIG. 9, if the PN sequence "0101 . . . " constituting the NMC watermark is further added onto the picture P2, on which the PN sequence "0011 . . . " constituting the OC watermark has been already added (refer to FIG. 3 and FIG. 4), the brightness values of a picture P3 become "a", "b+1", "c+1", "d+2", . . . . Then, the adder 27 outputs the picture, in which the NMC watermark is newly buried, to the record unit 50.

On the other hand, when the control signal Sg is not outputted from the watermark judgment unit 24, the generation of the PN sequence is not performed. As a result, since no signal is outputted from the PN sequence generation circuit 25, no signal is inputted into the adder 27. Therefore, the image inputted into the process unit 20 is transmitted through the adder 27 as it is and is outputted to the record unit 50.

In this manner, the process unit 20 outputs the picture to the record unit 50 as it is when the watermark is not buried in the inputted picture or when the NMC watermark is buried in the inputted picture. On the other hand, the process unit 20 buries the NMC watermark into the inputted picture by superimposing it on the inputted picture and outputs this picture to the record unit 50 when the OC watermark has been already buried in the inputted picture.

The record unit 50 shown in FIG. 7 records the picture outputted from the process unit 20 onto the optical disc 120 only when the control signal Sc1 to allow copying the digital video image is outputted from the process unit 20. Namely, the record unit 50 does not record the picture (i.e., a video output signal Sp) outputted from the process unit 20 onto the optical disc 120 when the control signal Sc2 to prohibit copying the digital video image is outputted from the process unit 20. As a result, the record unit 50 records the picture outputted from the process unit 20 onto the optical disc 120 if the watermark is not buried in the picture inputted to the process unit 20 or when the OC watermark is buried in the image inputted to the process unit 20. On the other hand, the record unit 50 does not record the picture outputted from the process unit 20 onto the optical disc 120 if the NMC watermark has been already buried in the picture inputted to the process unit 20.

In this manner, according to the video recorder 100 of the present embodiment, it is possible to identify whether the copy restriction given to the digital video image is to allow copying the digital information at the first generation or to prohibit copying the digital information, by use of the OC and NMC watermarks consisting of the two kinds of PN sequences different from each other. Further, in case that the watermark buried in the digital video image indicates to allow copying at the first generation, it is possible to change the copy restriction given to the digital video image from the first generation copy allowance to the copy prohibition, by burying the NMC watermark into the digital video image. By this, the basic requirements required for the watermark i.e., ① to restrain the deterioration of the quality of the video image ② not to have the audience watching the video image be aware of the existence of the watermark and ③ to realize the copy restriction easily and at a low cost, are fulfilled. At the same time, it is possible to realize the identification between the first generation copy allowance and the copy prohibition and also realize the change from the first generation copy allowance to the copy prohibition. Therefore, the generation management of the copy of the digital video image can be realized optimally.

Further, according to the video recorder 100 of the present embodiment, by burying the NMC watermark in the digital video image in which the OC watermark has been already buried, it is possible to change the copy restriction for the digital video image from the first generation copy allowance to the copy prohibition while maintaining the additional information other than the watermark buried in the digital video image.

For example, there is a case that the digital video image carries and hides the additional information related to the video image (e.g., information related to the content of the video image such as a movie, a drama, a sport broadcast) in the substantially same manner as the watermark. In such a case, if the brightness values of the picture are rewritten, there is a possibility that the additional information may be destroyed or erased. However, according to the video recorder 100 of the present embodiment, since the NMC watermark is merely added onto the brightness values of the picture as shown in FIG. 9, the additional information is not destroyed or erased.

Further, according to the video recorder 100 of the present embodiment, it is possible to easily generate the watermark consisting of the second PN sequence, which is distinctively different in structure from the first PN sequence, by generating the NMC watermark and the OC watermark by use of the PN sequence generation circuits 1 and 2 corresponding to the two kinds of polynomials different from each other, respectively. By this, it is possible to improve the distinction in identifying the OC watermark and the NMC watermark from each other.

Furthermore, according to the video recorder 100 of the present embodiment, by changing the intensity of the watermark which is to be buried in the digital video image in correspondence with the content of the picture, it is possible to precisely detect or identify the watermark while restraining the deterioration of the quality of the digital information due to burying the watermark. As the PN sequence constituting the NMC watermark and the PN sequence constituting the OC watermark have the orthogonal relationship with each other, it is possible to distinctly identify whether the watermark buried in the digital information is the OC watermark or the NMC watermark.

In the above described process unit 20 in the video recorder 100, the NMC watermark is buried into the digital video image, in which the OC watermark has been already buried, by superimposing it on the digital video image. However, the present invention is not limited to this. For example, it is possible to rewrite the watermark buried in the digital video image from the OC watermark to the NMC watermark.

Figure 10:
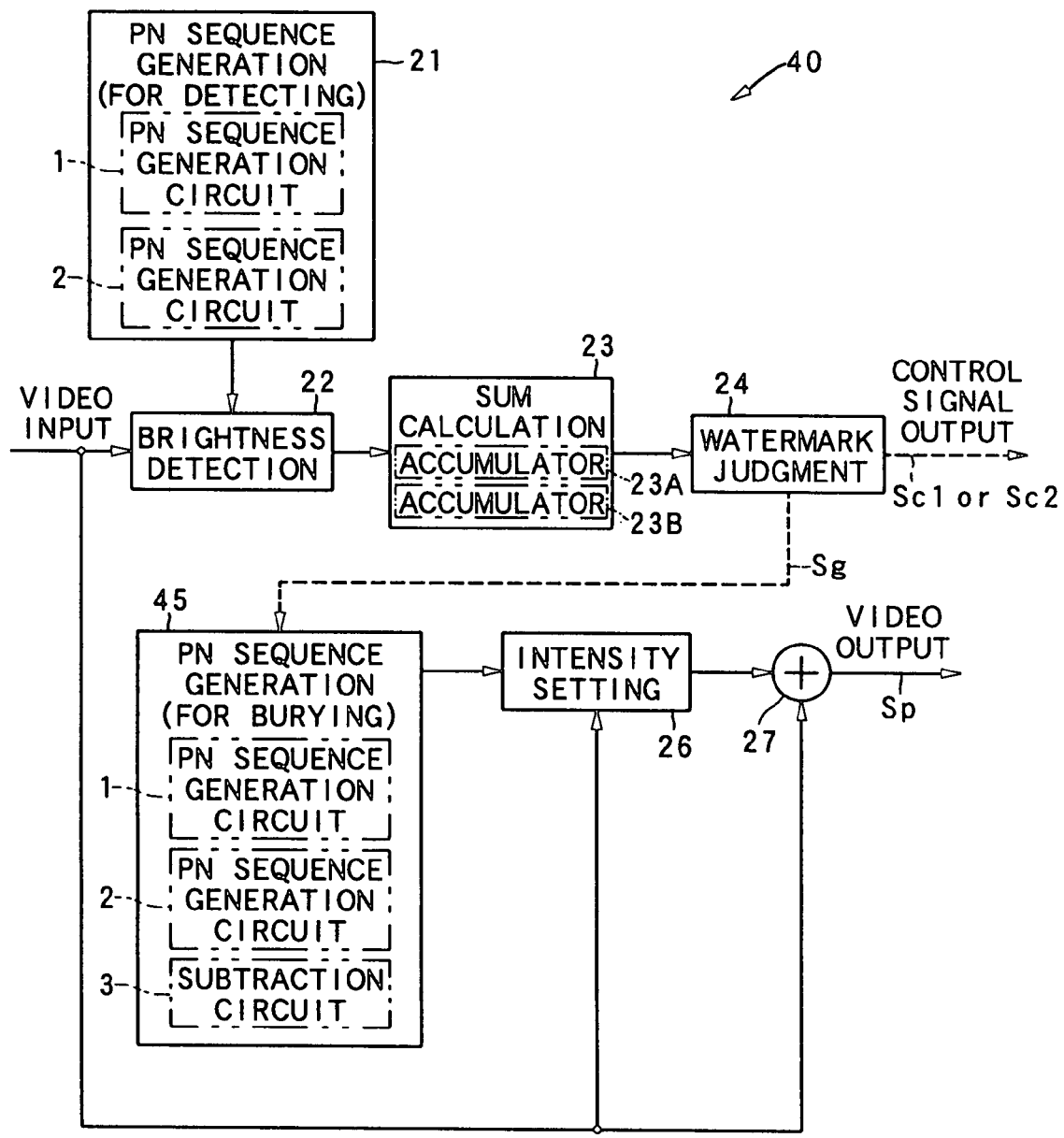
FIG. 10 is a block diagram showing a modified example of the process unit of the video recorder in the embodiment of the present invention.

In this case, the process unit of the video recorder is constructed as shown in FIG. 10, for example. Namely, a process unit 40 in FIG. 10 has a structure nearly same as the process unit 20 in FIG. 8 except for the PN sequence generation unit 45 for burying the watermark. The PN sequence generation unit 45 of the process unit 40 is provided with the PN sequence generation circuit 1 for generating the PN sequence constituting the OC watermark, the PN sequence generation circuit 2 for generating the PN sequence constituting the NMC watermark, and a subtraction circuit 3 for subtracting the PN sequence generated by the PN sequence generation circuit 1 from the PN sequence generated by the PN sequence generation circuit 2.

Figure 11:
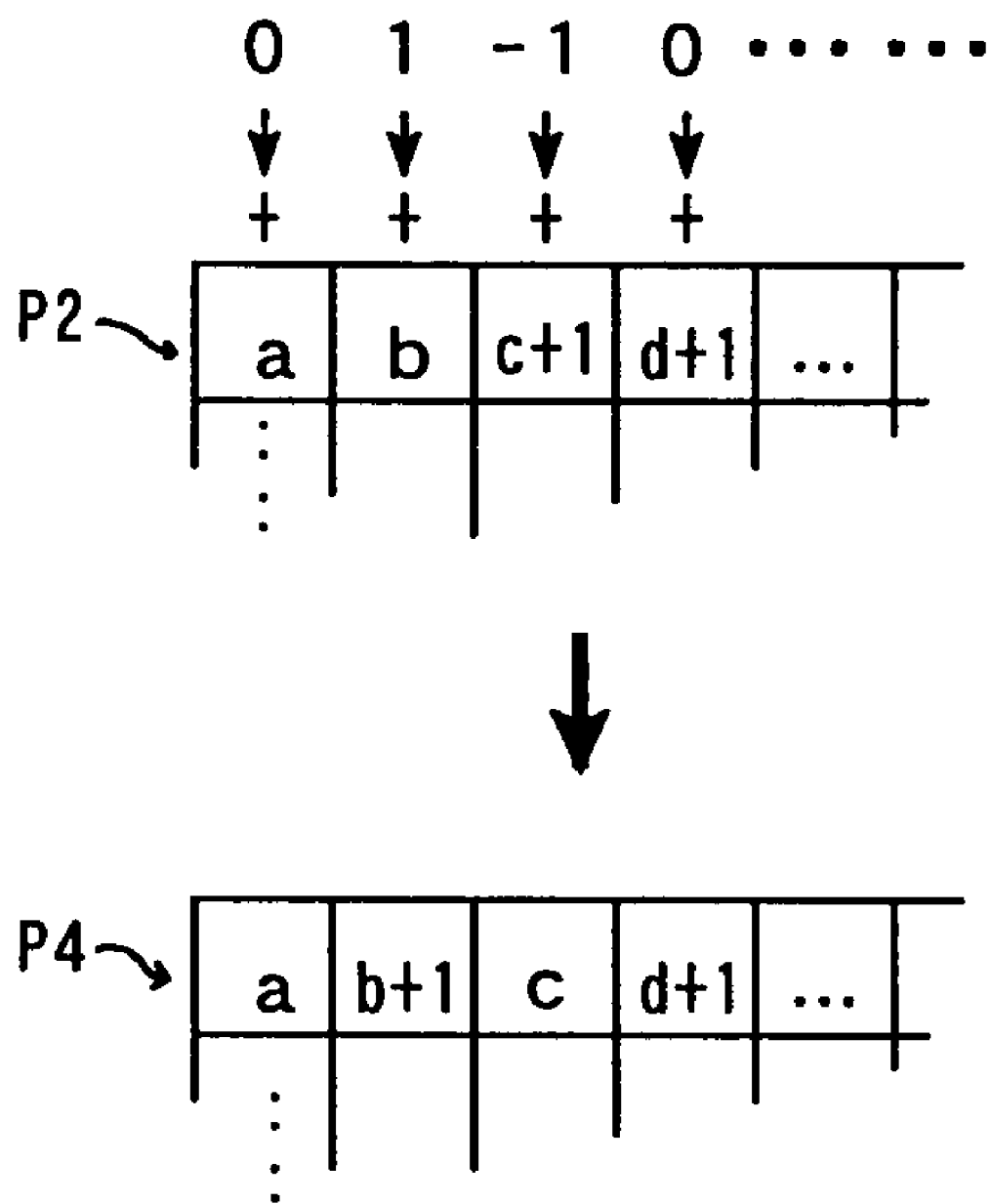
FIG. 11 is a diagram showing an example of rewriting the watermark in the embodiment of the present invention.

The operation of the PN sequence generation unit 45 is more concretely explained here. When the control signal Sg is outputted from the watermark judgment unit 24, the PN sequence generation unit 45 generates the PN sequence "0101 . . ." constituting the NMC watermark by virtue of the PN sequence generation circuit 2 for example. Then, the PN sequence generation unit 45 generates the PN sequence "0011 . . ." constituting the OC watermark by virtue of the PN sequence generation circuit 1 for example. Further, the PN sequence generation unit 45 generates the PN sequence "01-10 . . ." by subtracting the PN sequence "0011 . . ." constituting the OC watermark from the PN sequence "0101 . . ." constituting the NMC watermark by virtue of the subtraction circuit 3. Then, the PN sequence generation unit 45 outputs it to the intensity setting unit 26. The PN sequence "01-10 . . ." outputted from the PN sequence generation unit 45 is changed in its intensity as the occasion demands by the intensity setting unit 26, and is then added onto the brightness values of the picture inputted to the process unit 40, by the adder 27 as shown in FIG. 11.

As a result, the OC watermark buried in the picture is removed from the picture, and the NMC watermark is buried in the picture. According to the video recorder having such a structure, it is possible to rewrite the watermark buried in the picture from the OC watermark to the NMC watermark. Since the watermark is rewritten, it is possible to decrease the degree of the change in the brightness values by burying the watermark. Therefore, while restraining the deterioration of the quality of the digital information, it is possible to change the watermark from the OC watermark to the NMC watermark.

In the above described embodiments, although the PN sequence constituting the watermark is added onto the brightness values set for respective pixels of the picture, the present invention is not limited to this. For example, the PN sequence constituting the watermark may be added onto the other values set for respective pixels.

The PN sequence constituting the watermark is not limited to the M sequence. For example, other random sequence such as a Gold code may be employed as the PN sequence constituting the watermark.

In the above described embodiments, a case has been explained in which the watermark is constituted by the PN sequence. However, the present invention is not limited to this. For example, it is possible to constitute the watermark by another signal, in which random or nearly random codes are arranged or codes, whose arrangement is disciplined but whose disciplined manner cannot be easily recognized, are arranged.

Furthermore, in the above described embodiment, a case has been explained in which the code constituting the PN sequence and the pixel of the picture are one-to-one correspondent with each other. However, the present invention is not limited to this. For example, the picture (i.e., the picture plane) may be divided into a plurality of areas each consists of a plurality of pixels adjacent to each other, so that this area and the code constituting the PN sequence may be one-to-one correspondent with each other. Here, an example is explained in which the PN sequence "0101 . . . " constituting the NMC watermark is buried into the picture, which is divided into square areas each consisting of 4 pixels adjacent to each other. In this example, "0" is added onto all the brightness values of the 4 pixels included in the area disposed at the first in the image. Further, "1" is added onto all the brightness values of the 4 pixels included in the area disposed at the second in the image. In this manner, by making the codes constituting the PN sequence and the areas consisting of a plurality of pixels one-to-one correspondent with each other, the watermark can remain in the digital video image even if the digital video image is filtered or compressed.

Moreover, in the above described embodiment, a case has been explained in which the present invention is applied to the video recorder for recording the digital video image. However, the present invention is not limited to this. For example, the present invention can be applied to a recording apparatus for recording the digital audio sound.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-344075 filed on Dec. 3, 1998 including the specification, claims, drawings and summary is incorporated herein by reference in its entirety.

What is claimed is:

1. A method of restricting a copy of digital information comprising:
 a detecting process of detecting a first watermark, which is buried in the digital information and comprises a first signal generated on the basis of a first rule; and
 a burying process of burying a second watermark, which comprises a second signal generated on the basis of a second rule and having a structure different from that of the first signal, into the digital information if the first watermark is detected by the detecting process,
 wherein said burying process buries the second watermark by superimposing the second watermark onto the digital information in which the first watermark is buried, and
 wherein said burying process comprises a generating process of generating the second signal by using a generation equation, which is different from that used for generating the first signal, to thereby superimpose the second watermark generated by said generating process onto the digital information in which the first watermark is buried.

2. A method according to claim 1, wherein said burying process comprises an intensity changing process of changing an intensity of the second watermark in accordance with a content of the digital information, to thereby superimpose the second watermark whose intensity is changed by said intensity changing process onto the digital information in which the first watermark is buried.

3. A method of restricting a copy of digital information comprising:
 a detecting process of detecting a first watermark, which is buried in the digital information and comprises a first signal generated on the basis of a first rule; and
 a superimposing process of superimposing a second watermark onto the first watermark buried in the digital information, the second watermark comprising a second signal generated on the basis of a second rule and having a structure different from that of the first signal if the first watermark is detected by the detecting process,
 wherein said superimposing process comprising a generating process of generating the second signal by using a generation equation, which is different from that used for generating the first signal, to thereby superimpose the second watermark onto the first watermark.

4. A method according to claim 3, wherein the superimposing process comprises an intensity changing process of changing an intensity of the second watermark in accordance with a content of the digital information, to thereby superimpose the second watermark onto the first watermark.

5. A method according to claim 1, wherein
 the first watermark indicates to allow copying the digital information only at a first generation and
 the second watermark indicates to prohibit copying the digital information.

6. A method according to claim 3, wherein
 the first watermark indicates to allow copying the digital information only at a first generation and
 the second watermark indicates to prohibit copying the digital information.

7. A method according to claim 1, wherein
 the first signal comprises a first PN sequence and
 the second signal comprises a second PN sequence which is different from the first PN sequence.

8. A method according to claim 1, wherein
 the first signal comprises a first PN sequence and
 the second signal comprises a second PN sequence which is different from the first PN sequence.

9. A method according to claim 7, wherein
 the first PN sequence and the second PN sequence are orthogonal to each other.

10. A method according to claim 8, wherein
 the first PN sequence and the second PN sequence are orthogonal to each other.

11. An apparatus for restricting a copy of digital information comprising:
 a detecting device for detecting a first watermark, which is buried in the digital information and comprises a first signal generated on the basis of a first rule; and
 a burying device for burying a second watermark, which comprises a second signal generated on the basis of a second rule and having a structure different from that of the first signal, into the digital information if the first watermark is detected by the detecting device,
 wherein said burying device buries the second watermark by superimposing the second watermark onto the digital information in which the first watermark is buried, and
 wherein said burying device comprises a generating device for generating the second signal by using a generation equation, which is different from that used for generating the first signal, to thereby superimpose the second watermark generated by said generating device onto the digital information in which the first watermark is buried.

12. An apparatus according to claim 11, wherein said burying device comprises an intensity changing device for changing an intensity of the second watermark in accordance with a content of the digital information, to thereby superimpose the second watermark whose intensity is changed by said intensity changing device onto the digital information in which the first watermark is buried.

13. An apparatus for restricting a copy of digital information comprising:
   a detecting device for detecting a first watermark, which is buried in the digital information and comprises a first signal generated on the basis of a first rule; and
   a superimposing device for superimposing a second watermark onto the first watermark buried in the digital information, the second watermark comprising a second signal generated on the basis of a second rule and having a structure different from that of the first signal if the first watermark is detected by the detecting device,
   wherein said superimposing device comprising a generating device for generating the second signal by using a generation equation, which is different form that used for generating the first signal, to thereby superimpose the second watermark onto the first watermark.

14. An apparatus according to claim 13, wherein the superimposing device comprises an intensity changing device for changing an intensity of the second watermark in accordance with a content of the digital information, to thereby superimpose the second watermark onto the first watermark.

15. An apparatus according to claim 11, wherein
   the first watermark indicates to allow copying the digital information only at a first generation and
   the second watermark indicates to prohibit copying the digital information.

16. An apparatus according to claim 13, wherein
   the first watermark indicates to allow copying the digital information only at a first generation and
   the second watermark indicates to prohibit copying the digital information.

17. An apparatus according to claim 11, wherein
   the first signal comprises a first PN sequence and
   the second signal comprises a second PN sequence which is different from the first PN sequence.

18. An apparatus according to claim 13, wherein
   the first signal comprises a first PN sequence and
   the second signal comprises a second PN sequence which is different from the first PN sequence.

19. An apparatus according to claim 17, wherein
   the first PN sequence and the second PN sequence are orthogonal to each other.

20. An apparatus according to claim 18, wherein
   the first PN sequence and the second PN sequence are orthogonal to each other.

21. An apparatus comprising:
   a detecting device for detecting a first watermark in audio and/or video (AV) content, the detecting device comprising a first PN sequence generating circuit for generating a first PN sequence in accordance with a first equation, a first accumulator for accumulating values of an AV content characteristic for portions of the AV content determined in accordance with codes of the first PN sequence having a first value, a second accumulator for accumulating values of the AV content characteristic for portions of the AV content determined in accordance with codes of the first PN sequence having a second value, and a watermark judging unit for judging the presence or absence of the first watermark based on the contents of the first and second accumulators;
   a second PN sequence generating circuit, responsive to a judging by the watermark judging unit of the presence of the first watermark, for generating a second PN sequence in accordance with a second equation different than the first equation; and
   an adding circuit for adding the second PN sequence to the AV content as a second watermark.

22. An apparatus according to claim 21, further comprising:
   an intensity setting circuit for setting an intensity of the second PN sequence prior to adding the second PN sequence to the video content.

23. An apparatus according to claim 22, wherein the intensity setting circuit sets the intensity of the second PN sequence based on a characteristic of the AV content.

24. An apparatus according to claim 21, wherein the AV content characteristic is brightness and the portions of AV content are pixels.

25. An apparatus according to claim 21, wherein the first and second equations comprise polynomials.

26. An apparatus according to claim 21, wherein the second PN sequence is orthogonal to the first PN sequence.

27. An apparatus according to claim 21, wherein the detecting device is for further detecting the second watermark in the AV content in response to a judging by the watermark judging unit of the absence of the first watermark.

28. An apparatus according to claim 21, wherein the first watermark is a one copy watermark and the second watermark is a no copy watermark.

29. An apparatus according to claim 21, wherein the watermark judging unit judges the presence or absence of the first watermark based on a difference in the respective values accumulated in the first and second accumulators.

30. A recording apparatus comprising an apparatus according to claim 21.

31. A recording apparatus according to claim 30, wherein the watermark judging unit outputs a recording control signal for controlling a recording operation of the recording apparatus.

* * * * *